United States Patent [19]
Wang

[11] Patent Number: 5,971,684
[45] Date of Patent: Oct. 26, 1999

[54] FLUSH-MOUNTED, SPRING-ACTIVATED UTILITY HOOK ASSEMBLY

[76] Inventor: Calvin S. Wang, 14317 E. Don Julian Rd., Industry, Calif. 91746

[21] Appl. No.: 09/042,450

[22] Filed: Mar. 16, 1998

[51] Int. Cl.$^6$ ...................................................... B60P 7/08
[52] U.S. Cl. ............................................ 410/107; 410/111
[58] Field of Search ..................................... 410/101, 106, 410/107, 110, 111; 24/265 CD, 115 K; 248/499

[56] References Cited

U.S. PATENT DOCUMENTS

| | | | |
|---|---|---|---|
| 2,729,417 | 1/1956 | Maynard | 410/111 |
| 3,102,708 | 9/1963 | Crain | 410/107 |
| 4,948,311 | 8/1990 | St. Pierre et al. | 410/107 |
| 5,004,388 | 4/1991 | Harris | 410/107 |
| 5,444,897 | 8/1995 | Gross | 410/107 X |

*Primary Examiner*—Stephen T. Gordon
*Attorney, Agent, or Firm*—Albert O. Cota

[57] ABSTRACT

A flush-mounted, spring-activated utility hook assembly (10) designed to be attached to the side rails (188) of a pick-up truck or to a vertical wall. The assembly (10) consists of a cover plate (130) having a hook slot (136) from where a spring-biased utility hook (112) pivots from a retracted position to an extended functional position. The assembly (10) incorporates a hook release assembly (80) which includes a hook release tab (104) that projects from the surface of the cover plate (130). When the assembly (10) is not in use, the utility hook (112) is maintained in a retracted position by the hook release assembly (80). When the hook release tab (104) is moved outward, the assembly (180) releases and causes the hook (112) to move into its extended functional position. When a pair of assemblies (10) are attached to a truck, a tie-down cord can be attached between the two hooks (112) to secure a load. When the assembly (10) is attached to a vertical wall, it can be used to hang a variety of items when the hook (112) is placed in the extended position.

16 Claims, 3 Drawing Sheets

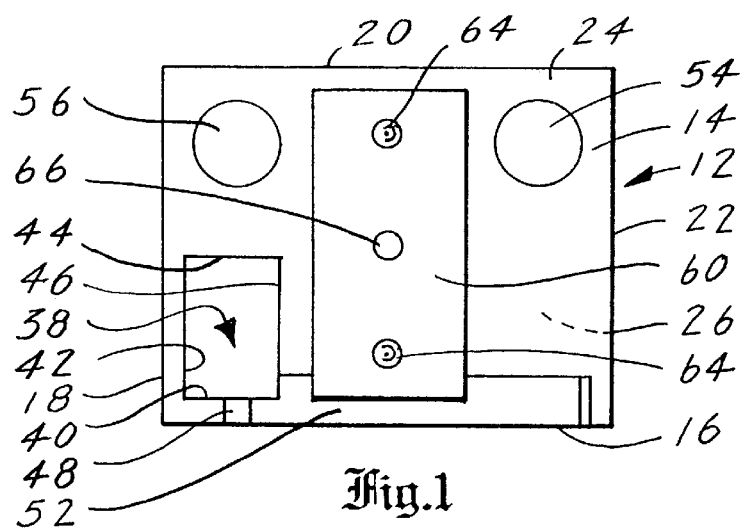
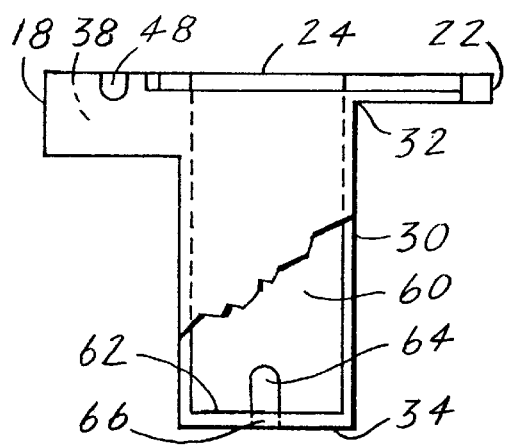# 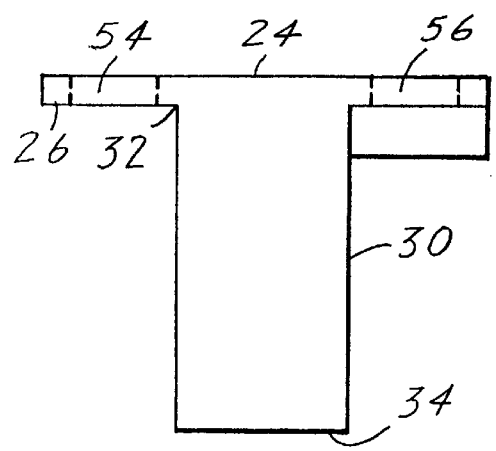
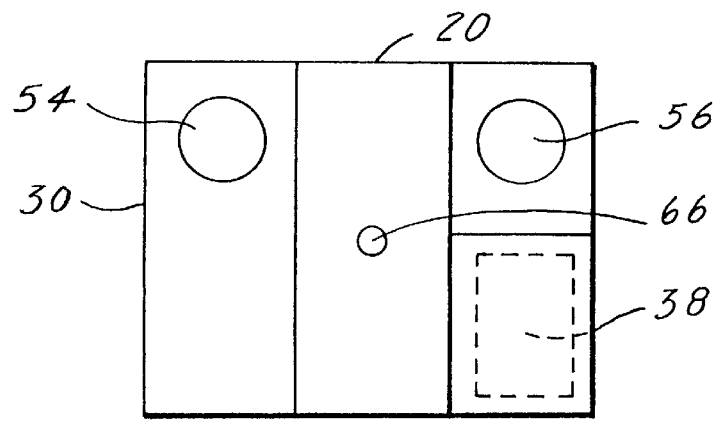

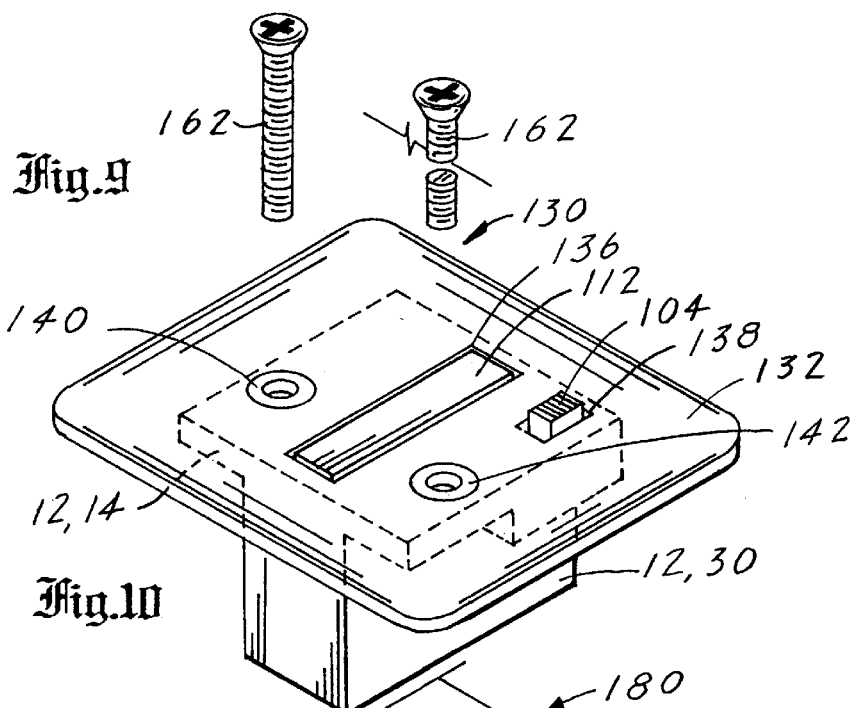

FLUSH-MOUNTED, SPRING-ACTIVATED UTILITY HOOK ASSEMBLY

TECHNICAL FIELD

The invention pertains to the general field of hook assemblies and more particularly to a flush mounted, spring-activated utility hook assembly that can be placed in either a retracted position or an extended functional position by moving an accessible hook release tab.

BACKGROUND ART

The present invention relates to a tie down fitting and more particularly to a set of retractable tie down fittings that are mounted within stake holes located on the side rails of a pick-up truck. The tie down fittings are used for securing truck bed cargo located on the bed of a pick-up truck.

In most common way to secure cargo located on the truck bed is by using tie downs which provide the anchorage to maintain the originally loaded position of the cargo. The usual tie down is in the form of an eye cleat or hook that is attached to the side rails of a truck bed by screws or similar devices and in some designs through specially cut openings in the truck's side rails. Finding the proper location for cutting the openings, as well as the actual installation of the tie downs, can be a long and painstaking process and if bolts are used, rather than screws, access to both sides of the truck's side rail is required.

Due to the semi-permanent nature of the tie down hook's installation and because the hook openings which remain may detract from the original appearance of the truck it is impractical for a truck owner to remove the tie downs for use on another truck.

A search of the prior did not disclose any patents that read directly on the claims of the instant invention, however, the following U.S. patents are considered related:

| U.S. Pat. No. | INVENTOR | ISSUED |
| --- | --- | --- |
| 4,762,449 | St. Pierre, et al | 9 August 1988 |
| 4,295,765 | Burke | 20 October 1981 |
| 3,102,708 | Crain | 3 September 1963 |

The U.S. Pat. No. 4,762,449 St. Pierre, et al patent discloses a tie down fitting adapted to fit within a stake hole of a pickup truck. The fitting includes a cover plate that fits over the top of the stake hole and a clamping plate that fits over the bottom of the stake hole. The cover plate is secured to the clamping plate by means of threaded fasteners. The fitting includes aligned slots in the two plates that receive a hook member which pivotally moves between a recessed position flush with the wall section to an extended position where it can be used to engage a cargo securing line. To move the hook member from its recessed position to its extended position a finger on a hand is used to press the hook member to cause it to pivot to its extended position.

The U.S. Pat. No. 4,295,765 Burke patent discloses a tie-down structure that includes a body member having a top wall, an outwardly flaring side wall and a threaded stem. The treaded stem extends through an opening in a supporting surface, and a plug member and threaded means as disposed on the threaded stem on a side of the supporting surface opposite to that of the head. With this arrangement, the plug member is freely movable on the threaded stem of the body member.

The U.S. Pat. No. 3,102,708 Crain patent discloses a retractable rope hook that mounts on the top rail of a truck. The rope hook includes a housing that is attached to a mounting plate and a hook member vertically and slidably disposed within a cavity in the housing. Within the housing is also located a compression spring that biases the hook member into its raised position. Interposed between the housing and hook member is a latch that controls the movement of the hook member. The latch is activated by a mechanical actuating lever located on the upper surface of the mounting plate.

For background purposes and as indicative of the art to which the invention is related reference may be made to the remaining cited patents.

| PATENT NO. | INVENTOR | ISSUED |
| --- | --- | --- |
| 5,326,203 | Cockrell | 5 July 1994 |
| 5,271,128 | Hook | 21 December 1993 |
| WO91/04883 | WIPO | 18 April 1991 |
| 4,909,658 | Townsend | 20 March 1990 |
| 4,657,299 | Mahan | 14 April 1987 |
| 4,531,775 | Beals | 30 July 1985 |
| 3,966,250 | Winskas | 29 June 1976 |
| 3,951,250 | Ott | 2 March 1976 |
| 3,298,652 | Burdick | 17 March 1965 |

DISCLOSURE OF THE INVENTION

The flush-mounted, spring-activated utility hook assembly is designed to be easily attached to an assembly mounting structure that includes the side rails of a pick-up type truck or a vertical wall. When attached in aligned pairs, across the truck's side rails, the hooks can be used to attach tie-down cords to secure a load. When attached to a vertical wall, the hook can be used to hang a myriad of items.

In its most basic form, the assembly is comprised of the following elements:

a) A housing having an upper surface a lower surface, a hook release cavity, a trip-rod slot, a trip-rod ledge, a first plate bore, a second plate bore and a hook spring cavity.

b) A hook spring dimensioned to slidably fit into the hook spring cavity.

c) A hook release assembly consisting of:
   (1) a trip rod having an outer end form where extends a straight section having an inner end. From the inner end extends a first side of a U-section having a second side which terminates with a second end,
   (2) a compression spring inserted into the second side of the U-section, and
   (3) a hook release tab that is attached to the second end and that is dimensioned to traverse along the hook-release cavity, d) A utility hook having an upper horizontal section, a vertical section and a lower horizontal section. The upper horizontal section has a lateral trip-rod slot and the lower horizontal section has a trip-rod step and is dimensioned to longitudinally traverse the hook-spring cavity. When the utility hook is in a retracted position, the trip rod slot is inserted into the straight section of the trip rod which maintains the utility hook in the retracted position. When the hook release tab is moved outward, the straight section of the trip rod also moves forward to release the utility hook and allow the hook spring to place the utility hook into an extended, functional position. When the hook is extended, the trip rod step engages the straight section of the trip rod to maintain the utility hook in the extended, functional position.

e) A cover plate having means for being attached to the upper surface of the housing.

f) An assembly mounting structure.

g) Means for attaching the assembly to the assembly mounting structure.

The cover plate includes a hook slot, a tab slot, a first attachment bore and a second attachment bore. The plate is rigidly attached to the upper surface of the horizontal section of the housing. When attached, the utility hook extends through the hook slot and the hook release tab projects through the tab slot.

The assembly mounting structure typically consists of a flat surface having an opening therethrough such as found on the side rails of a pick-up truck. The opening is dimensioned to accept the horizontal and vertical sections of the housing.

To attach the flush-mounted, spring-activated utility hook assembly to the assembly mounting structure an assembly mounting plate is utilized. This mounting plate includes a rectangular slot and threaded left and right bolt bores. To commence the attachment, the cover plate with the attached housing is placed into the opening on the assembly mounting structure. A set of mounting bolts are then inserted through the first and second attachment bores on the cover plate and subsequently are threaded into the respective threaded left and right bores on the mounting plate. When the bolts are tightened the flush-mounted spring-activated utility hook assembly is securely attached to the assembly mounting structure.

In view of the above disclosure, it is the primary object of the invention to provide a flush-mounted, spring-activated utility hook assembly which includes a two-position hook release tab. In one position the utility hook is placed in a retraced position. When the tab is moved outwardly, it releases the utility hook to allow the hook to move to its extended, functional position.

In addition to the primary object, it is also an object of the invention to provide an assembly that:

is simple in design and of rugged construction so that it can attain a long service life, is aesthetically pleasing when attached to an assembly mounting structure, can be made in several sizes, shapes and utility hook strengths, can be manufactured in a variety of colors and finishes, is made with a minimum number of parts, is cost-effective from both a manufacturer and consumer points of view.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a top plan view of the flush-mounted spring-activated utility hook assembly housing.

FIG. 2 is a front elevational view of the housing.

FIG. 3 is a rear elevational view of the housing.

FIG. 4 is a bottom plan view of the housing.

FIG. 9 is a perspective view of the assembly mounting bolts.

FIG. 10 is a perspective view of the assembly mounting bolts.

FIG. 11 is a perspective view of the assembly mounting structure.

FIG. 12 is a perspective view of the gasket.

FIG. 13 is a perspective view of the assembly mounting plate. FIGS. 9–13 also depict an exploded assembly view of the flush-mounted, spring-activated utility hook assembly.

BEST MODE FOR CARRYING OUT THE INVENTION

Figure 5:
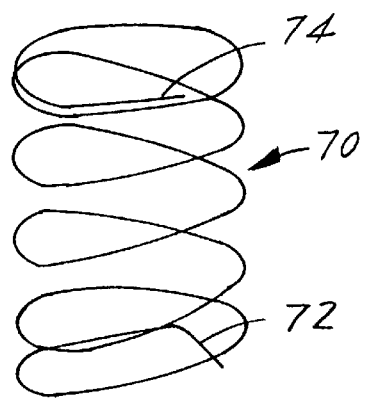
FIG. 5 is a perspective view of the hook spring.

The best mode for carrying out the invention is presented in terms of a preferred embodiment for a flush-mounted, spring-activated utility hook assembly that is particularly adaptable for attachment to the side rails of a truck. The preferred embodiment of the utility hook assembly 10, as shown in FIGS. 1–13, is comprised of the following major elements: a housing 12, a hook spring 70, a hook release assembly 80, a utility hook 112, a cover plate 130, an assembly mounting plate 146 and a gasket 164.

The housing 12, as shown best in FIGS. 1–4, is preferably constructed of a metal and integrally includes a horizontal section 14, a vertical section 30, a hook release cavity 38, a trip rod ledge 52, a first plate bore 54, a second plate bore 56 and a hook-spring cavity 60.

The horizontal section 14, as shown in FIG. 1, includes a first edge 16, a second edge 18, a third edge 20, a fourth edge 22, an upper surface 24 and a lower surface 26. The vertical section 30 which extends downward, as shown in FIGS. 2 and 3, has an upper surface 32 and a lower surface 34. The upper surface 32 is integral with the lower surface 34 of the horizontal section 14.

The hook release cavity 38, as also shown in FIG. 1, is located adjacent the corner bordered by the first edge 16 and the second edge 18. The cavity 38 includes a first side 40 that is adjacent the first edge 16, a second side 42, a third side 44 and a fourth side 46. Substantially centered on the portion of the first edge 16, which encompasses the hook release cavity 38, is located the trip-rod slot 48. The trip rod ledge 52 commences near the fourth edge 22, extends along the first edge 16 and intersects with the fourth side 46 of the hook release cavity 38.

The first plate bore 54 is located adjacent the corner bordered by the third edge 20 and the fourth edge 22. Likewise, the second plate bore 56 is located adjacent the corner bordered by the second edge 18 and the third edge 20. As shown in FIG. 1, the second plate bore 56 is in substantial alignment with the first plate bore 54.

The final element which comprises the housing 12 is the hook-spring cavity 60 which is located between the first and second plate bores 54, 56. The cavity 60 extends along the perimeter of the vertical section 30 and terminates with a lower surface 62 as best shown in FIG. 2. The lower surface, as shown in FIGS. 1 and 2 may also include a pair of upstanding pegs 64 and a moisture release bore 66. The pegs 64 aid in maintaining the hook spring 70 positioned within the hook spring cavity 60. The moisture release bore 66 allows any moisture accumulated during inclement weather to be released from the housing 12.

Figure 8:
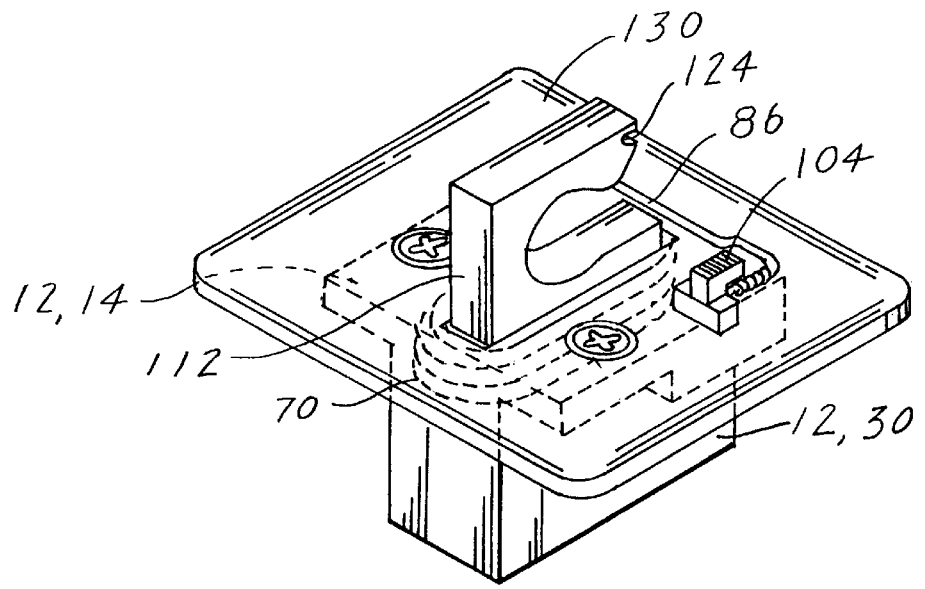
FIG. 8 is a perspective view of the flush-mounted spring-activated utility hook assembly showing the relative placement of the housing, the hook spring, the hook release assembly, the cover plate, and the utility hook shown in the extended functional position.

The hook spring 70 is shown as a separate element in FIG. 5 and installed in the assembly 10 in FIG. 8. The spring 70 includes an angled lower end 72, an upper end 74 and is dimensioned to slidably fit into the hook-spring cavity 60. The lower end 72 fits between the two pegs 64.

Figure 6:
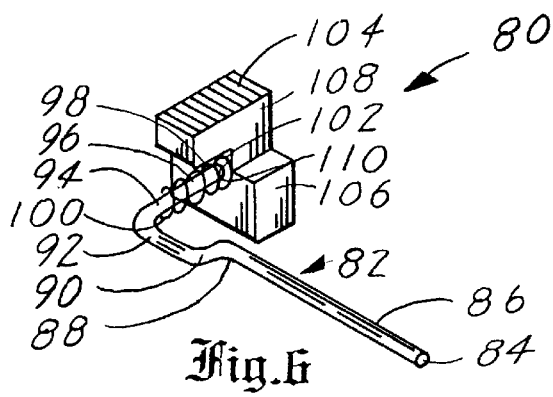
FIG. 6 is a perspective view of the hook release assembly.

The hook-release assembly 80, as shown as a separate element in FIG. 6 and installed in the assembly 10 in FIG. 8, is comprised of three integral sections: a trip rod 82, compression spring 98, and a hook-release tab 104. The trip rod 82 has an outer end 84 from where extends a straight section 86 having an inner end 88. From the inner end 88 extends a first side 90 of a U-section 92 which also has a second side 94 that terminates with a second end 96. The compression spring 98 includes an outer end 100, an inner end 102 and a diameter that is dimensioned to fit into the second side 94 of the U-section 92.

The hook-release tab 104 includes a lower section 106 and an upper section 108 that extends above the lower section 106. The lower section 106 is dimensioned to traverse along the hook-release cavity 38 and includes a cavity 110 dimensioned to frictionally accept the second end 96 of the U-section 92 that extends from the inner end 102 of the compression spring 98. The straight section 86 of the trip rod is dimensioned to fit into the trip rod ledge 52 and the second side 94 of the U-section 92 is dimensioned to fit into the trip-rod slot 48.

When the hook release assembly 80 is in place, the outer end 100 of the compression spring is held against the first side 40 of the hook release cavity 38. Likewise, the inner end 102 of the compression spring 98 is held against the surface of the lower section 106 of the hook-release tab 104. Under these conditions, the compression force of the spring 98 keeps the tab 104 biased in an inward direction against the third side 44 of the hook release cavity 38.

Figure 7:
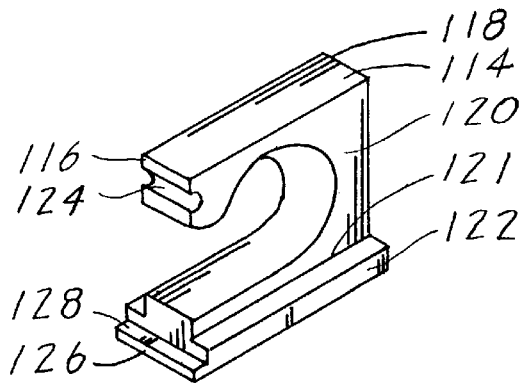
FIG. 7 is a perspective view of the utility hook.

The utility hook 112 is shown as a separate element in a FIG. 7 and installed in the assembly 10 in an extended, functional position in FIG. 8. The hook 112 includes an upper horizontal section 114 having a first end 116 and a second end 118, a vertical section 120 having a lower end 121 and a lower horizontal section 122. The vertical section 120 integrally extends downward from the second end 118 of the upper horizontal section 114. The lower horizontal section 122 integrally extends outward from the lower end 121 of the vertical section 120 and is in substantial alignment with the upper horizontal section 114. The first end 116 of the upper horizontal section 114 has a lateral trip-rod slot 124 and the outward end 126 of the lower horizontal section 122 has a trip-rod step 128.

The lower horizontal section 122 is dimensioned to longitudinally and slidably traverse the hook-spring cavity 60. When the utility hook 112 is in a retracted position, as shown in FIG. 9, the trip-rod slot 124 is inserted into the straight section 86 of the trip rod 82. When the hook release tab 104 on the hook-release assembly 80 is moved outward, with a finger, the straight section 86 of the trip rod 82 also moves forward to release the utility hook 112 and allow the hook spring 70 to release its compressive force and place the utility hook 112 into an extended, functional position as shown in FIG. 8. When the utility hook 112 is in the functional position, the trip rod step 128 engages the straight section 86 of the trip rod 82 to lock and maintain the utility hook 112 in the functional position.

The cover plate 130, as shown in FIG. 10 includes an upper surface 132, a lower surface 134, a hook slot 136, a tab slot 138, a first attachment bore 140 and a second attachment bore 142. The cover plate 130 is dimensioned to fit over and be attached to the horizontal section 14 of the housing 12. The preferred means for attaching the cover plate 130 to the upper surface 24 of the horizontal section 14 of the housing 12 is accomplished by a crimping method. In this method, the metal protruding from the first and second attachment bores 140, 142 on the cover plate 130 is crimped over the lower surface 26 of the horizontal section 14 which surrounds the first and second plate bores 54, 56.

When so fitted, the first and second attachment bores 140, 142 are in respective alignment with the first and second plate bores 54, 56 on the housing 12. When the cover plate 130 is attached, the upper surface of the horizontal section 114 of the utility hook 112 is substantially flush with the hook slot 136 when the hook is in the retracted position as shown in FIG. 10. Conversely, when the hook is in the functional position it extends upward through the hook slot 136 as shown in FIG. 8. As also shown in FIG. 10, the upper section 108 of the hook release tab 104 projects through the tab slot 138 on the cover plate 130.

The flush-mounted, spring-activated utility hook assembly 10 includes a means for being attached to an assembly mounting structure 180 as shown in FIG. 11. The structure 180 includes an upper surface 182, a lower surface 184 and an opening 186 therethrough that is dimensioned to accept the both the horizontal section 14 and the vertical section 30 of the housing 12. The assembly mounting structure 180, as described above, is typically found on the side rails 188 of a pick-up type truck as also shown in FIG. 11.

The preferred means for attaching the assembly 10 to the assembly mounting structure 180 is accomplished by an assembly mounting plate 146 as shown in FIG. 13. The mounting plate 146 includes an upper edge 148, a lower edge 150, a left edge 152 and a right edge 154. Substantially centered between the left and right edges 152, 154 is a rectangular slot 156 which is dimensioned to be inserted over and around the vertical section 30 of the housing 12 projecting through the opening 186 of the assembly mounting structure 180. Adjacent the sides of the rectangular slot 156 are located a threaded left bolt bore 158 and a threaded right bolt bore 160 which are laterally spaced to correspond with the spacing of the respective first and second attachment bores 140, 142 located on the cover plate 130.

To secure the assembly 10 to the assembly mounting structure 180, the cover plate 130, with the attached housing 12 is first placed into the opening 186 on the assembly mounting structure 180. After placement, the assembly mounting plate 146 is placed over the vertical section 30 of the housing 12 that is protruding through the rectangular slot 156 on the assembly mounting plate 146. When so placed, a set of mounting bolts 162, as shown in FIG. 9, are inserted through the first and second attachment bores 140, 142 on the cover plate 130 and threaded into the respective threaded left and right bores 158, 160 on the assembly mounted plate 146. The mounting bolts 162 are then tightened to securely attach the flush-mounted spring-activated utility hook 10 to the assembly mounting structure 180.

To further secure the assembly 10 a gasket 164 which can be made of rubber, cork or other similar materials may be used. The gasket 164, as shown in FIG. 12, has an opening 166 which allows the gasket to be placed between the lower surface 134 of the cover plate 130 and the upper surface 182 of the assembly mounting structure 180.

While the invention has been described in complete detail and pictorially shown in the accompanying drawings it is not to be limited to such details, since many changes and modifications may be made in the invention without departing from the spirit and scope thereof. For example, the assembly 10 can also be attached to a flat vertical wall having a cavity dimensioned to receive the housing 12 protruding from the cover plate 130. In this case, an assembly mounting plate 146 would not be necessary since the cover plate 130 would be attached to the flat vertical wall by a pair of screws or bolts inserted through the first and second attachment bores 140, 142 on the cover plate 130. Hence, it is described to cover any and all modifications and forms which may come within the language and scope of the appended claims.

I claim:

1. A flush-mounted, spring-activated utility hook assembly comprising:
    a) a housing having an upper surface, a lower surface, a vertical section, a hook release cavity, a trip-rod slot, a trip-rod ledge, a first plate bore, a second plate bore, and a hook spring cavity,
    b) a hook spring dimensioned to slidably fit into the hook spring cavity,
    c) a hook release assembly comprising:
        (1) a trip rod having an outer end from where extends a straight section having an inner end from where extends a first side of a U-section having a second side which terminates with a second end,
        (2) a compression spring inserted into the second side of the U-section, and
        (3) a hook release tab that is attached to the second end and that is dimensioned to traverse along the hook-release cavity,
    (d) a utility hook having an upper horizontal section, a vertical section and a lower horizontal section, wherein the upper horizontal section having a lateral trip-rod slot and the lower horizontal section having a trip-rod step and is dimensioned to longitudinally traverse the hook-spring cavity, wherein when said utility hook is in a retracted position, the trip rod slot is inserted into the straight section of the trip rod which maintains said utility hook in the retracted position, and wherein when the hook release tab is moved outward the straight section of the trip rod also moves forward to release the utility hook and allow said hook spring to place the utility hook into an extended, functional position, wherein when extended, the trip rod step engages the straight section of the trip rod to maintain said utility hook in the extended functional position,
    e) a cover plate having means for being attached to the upper surface of said housing,
    f) an assembly mounting structure, and
    g) means for attaching said flush-mounted spring-activated utility hook assembly to said assembly mounting structure.

2. The assembly as specified in claim 1 wherein said cover plate has a rectangular shape.

3. The assembly as specified in claim 1 wherein said cover plate has a circular shape.

4. The assembly as specified in claim 1 further comprising a pair of upstanding pegs located on the bottom surface of the hook spring cavity wherein said pegs aid in maintaining said hook spring positioned within the hook spring cavity.

5. The assembly as specified in claim 1 wherein said hook spring cavity further comprises a lower surface having a moisture release bore extending therethrough.

6. The assembly as specified in claim 1 wherein said assembly mounting structure comprises an upper surface, a lower surface and an opening therethrough dimensioned to accept a horizontal and vertical section of said housing.

7. The assembly as specified in claim 5 wherein said means for attaching said assembly to said assembly mounting structure is accomplished by an assembly mounting plate comprising:

a) an upper edge, a lower edge, a left edge and a right edge,
    b) a rectangular slot substantially centered between the left and right edges and dimensioned to fit over and around a vertical section of the housing, and
    c) a threaded left bolt bore and a threaded right bolt bore which are laterally spaced to correspond with the spacing of respective first and second attachment bores located on said cover plate, wherein when said cover plate with the attached housing is placed into an opening on the assembly mounting structure and the assembly mounting-plate is inserted over and around the vertical section of said housing protruding through a rectangular slot on the assembly mounting plate, when so placed, a set of mounting bolts are inserted through a first and a second attachment bore on said cover plate, threaded into the respective threaded left and right bores on said assembly mounting plate and tightened to securely attach said flush-mounted spring-activated utility hook assembly to the assembly mounting structure.

8. A flush-mounted, spring-activated utility hook assembly comprising:
    a) a housing having:
        (1) a horizontal section having a first edge, a second edge, a third edge, a fourth edge, an upper surface and a lower surface,
        (2) a vertical section having an upper surface, and a lower surface, wherein the upper surface is integral with the lower surface of said horizontal section,
        (3) a hook release cavity located adjacent the corner bordered by the first edge and the second edge, wherein said cavity includes a first side adjacent the first edge, a second side, a third side and a fourth side, wherein said cavity having a trip-rod slot substantially centered on the portion of the first edge encompassing the hook release cavity,
        (4) a trip rod ledge that commences near the fourth edge, extends along the first edge and intersects with the fourth side of the hook release cavity,
        (5) a first plate bore located adjacent the corner bordered by the fourth edge and the third edge,
        (6) a second plate bore located adjacent the corner bordered by the second edge and the third edge and which is in substantial alignment with said first plate bore,
        (7) a hook-spring cavity located between the first and second plate bores, having a lower surface and extending along the perimeter of said vertical section,
    b) a hook spring having an upper end and a lower end wherein said hook spring is dimensioned to slidably fit into the hook-spring cavity,
    c) a hook-release assembly comprising:
        (1) a trip rod having an outer end from where extends a straight section having an inner end from where integrally extends a first side of a U-section having a second side which terminates with a second end,
        (2) a compression spring having an outer end, an inner end and a diameter that is dimensioned to fit into the second side of the U-section, and
        (3) a hook-release tab having a lower section dimensioned to traverse along the hook-release cavity and an upper section that extends above the lower section, wherein said lower section having a cavity dimensioned to frictionally accept the second end of the U-section that extends from the inner end of the compression spring, wherein the straight section of the trip rod is dimensioned to fit into the trip rod ledge and the second side of the U-section is dimensioned to fit into the trip-rod slot, wherein when said hook-release assembly is in place, the outer end of the compression spring is held against the first side of the hook release cavity and the inner end of the compression spring is held against a surface of the lower section of the hook-release tab, keeping the tab biased in an inward direction against the third side of the hook release cavity, d) a utility hook having an upper horizontal section with a first end and a second end, a vertical section that integrally extends downward from the second end of the upper horizontal section and a lower horizontal section that integrally extends outward from the vertical section in substantial alignment with the upper horizontal section, wherein the first end of the upper horizontal section having a lateral trip-rod slot and the outward end of the lower horizontal section having a trip-rod step, wherein the lower horizontal section is dimensioned to longitudinally traverse the hook-spring cavity, wherein when said utility hook is in a retracted position, the trip-rod slot is inserted into the straight section of the trip rod which maintains said utility hook in the retracted position, and wherein when the hook release tab on said hook-release assembly is moved forward the straight section of the trip rod also moves forward to release the utility hook and allow said hook spring to place the utility hook into an extended functional position wherein when extended the trip-rod step engages the straight section of the trip rod to lock and maintain said utility hook in the extended functional position, e) a cover plate having an upper surface, a lower surface, a hook slot, a tab slot, a first attachment bore and a second attachment bore, wherein said cover plate is dimensioned to fit over and be attached, by an attachment means, to the upper surface of the horizontal section of said housing with the first and second attachment bores in respective alignment with the first and second plate bores on said housing, wherein when said cover plate is attached, the upper horizontal section of said utility hook extends through the hook slot and the upper section of the hook release tab projects through the tab slot, f) an assembly mounting structure, and g) means for attaching said flush-mounted, spring-activated utility hook assembly to said assembly mounting structure.

9. The assembly as specified in claim 8 further comprising a pair of upstanding pegs located on the lower surface of the hook spring cavity wherein said pegs aid in maintaining said hook spring positioned within the hook spring cavity.

10. The assembly as specified in claim 8 wherein said hook spring cavity lower surface including a moisture release bore extending therethrough.

11. The assembly as specified in claim 4 wherein said assembly mounting structure comprises an upper surface, a lower surface and an opening therethrough dimensioned to accept a vertical section of said housing.

12. The assembly as specified in claim 8 wherein said means for attaching said assembly to said assembly mounting structure comprises an assembly mounting plate having:

a) an upper edge, a lower edge, a left edge and a right edge, b) a rectangular slot substantially centered between the left and right edges and dimensioned to fit over and around the vertical section of said housing, and c) a threaded left bolt bore and a threaded right bolt bore which are laterally spaced to correspond with the spacing of the respective first and second attachment bores on said cover plate, wherein when said cover plate with the attached housing is placed into the opening on the assembly mounting structure and the assembly mounting plate is placed over the vertical section of said housing protruding through the rectangular slot on the assembly mounting plate, when so placed, a set of mounting bolts are inserted through the first and second attachment bores on said cover plate and threaded into the respective threaded left and right bores and tightened to securely attach said flush-mounted spring-activated utility hook assembly to the assembly mounting structure.

13. The assembly as specified in claim 8 wherein said means for attaching said cover plate to the upper surface of the horizontal section of said housing is accomplished by crimping the metal protruding from the first and second attachment bores over a lower surface of the horizontal section which surrounds the first and second plate bore.

14. The assembly as specified in claim 11 further comprising a gasket having an opening which allows said gasket to be placed between the lower surface of said cover plate and the upper surface of the assembly mounting structure.

15. The assembly as specified in claim 8 wherein said assembly mounting structure is located on side rails of trucks.

16. The assembly as specified in claim 12 wherein said assembly mounting plate is particularly adaptable for attaching to the side rails of pick-up type trucks.

* * * * *